Dec. 11, 1956  G. A. CONNELL ET AL  2,773,757
PROCESS AND COMPOSITION FOR APPLICATION
OF SODIUM BORATE FOR VEGETATION CONTROL
Filed May 14, 1953
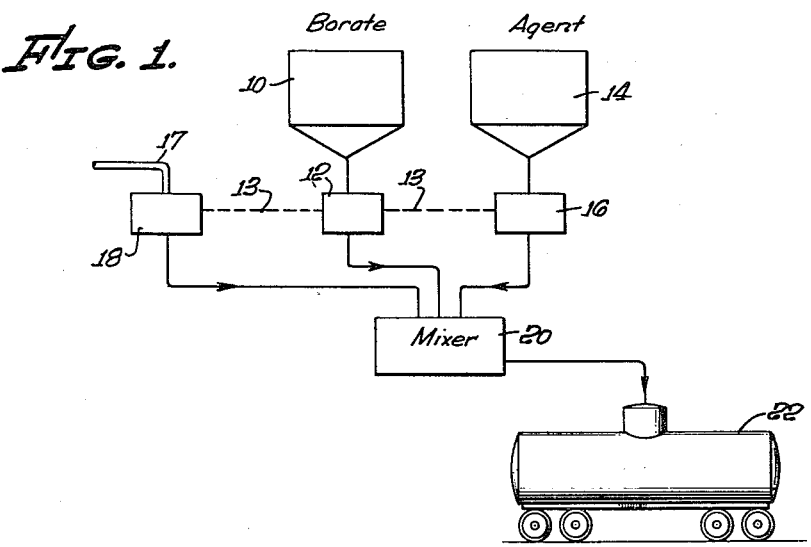
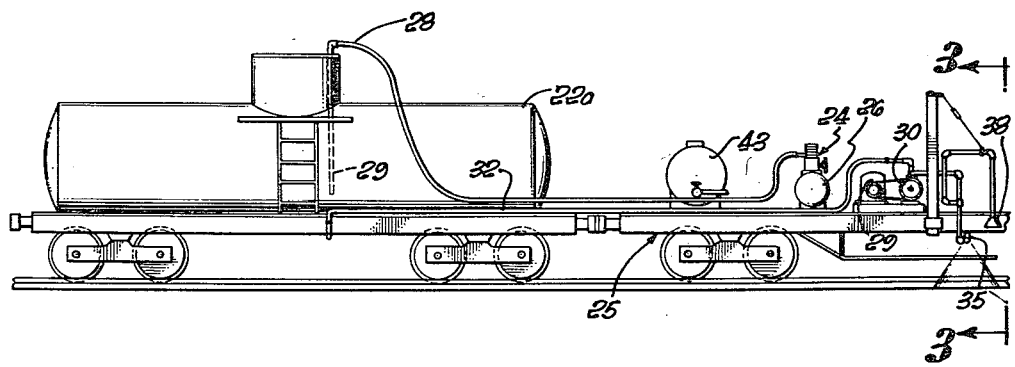
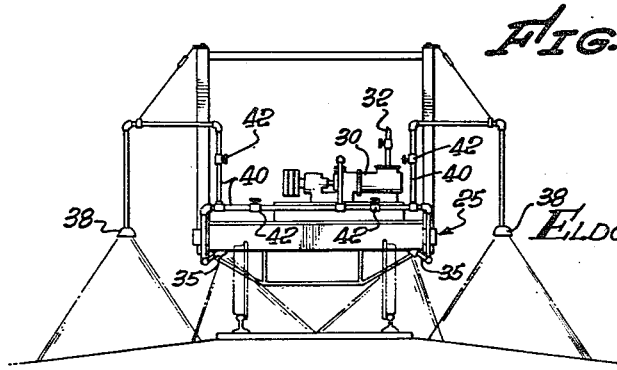
GEORGE A. CONNELL,
ELDON L. PADDOCK,
INVENTORS.
BY
Barkelew & Saulsbury
ATTORNEYS

United States Patent Office

2,773,757
Patented Dec. 11, 1956

2,773,757

PROCESS AND COMPOSITION FOR APPLICATION OF SODIUM BORATE FOR VEGETATION CONTROL

George A. Connell, Los Angeles, and Eldon L. Paddock, Orange, Calif., assignors, by mesne assignments, to United States Borax & Chemical Corporation Application May 14, 1953, Serial No. 355,132

11 Claims. (Cl. 71—2.2)

This invention has to do generally with processes and means for distributing certain types of chemical agents for controlling vegetation. The invention is concerned in particular with the distribution of chemical compositions that include sodium borate as a primary active ingredient.

Sodium borates, such as sodium metaborate, sodium pentaborate and ordinary crude borax, for example, have been known for many years as effective weed-killing agents.

Borate compositions for treating vegetation have ordinarily been applied to the ground or to the vegetation itself either by broadcasting the dry granular material or by dissolving that material in water to form a solution and spraying the ground or vegetation with the solution. Each of those methods is satisfactory within certain fields of use.

However, for some types of application previously available methods are not fully satisfactory. For example, application in dry form may result in uneven or incomplete distribution. A further difficulty with dry application, particularly in windy locations, is that an originally satisfactory distribution may later become uneven, as by blowing of the material away from smooth open areas and its collection in crevices and gullies. That difficulty is particularly severe in the treatment of railroad rights of way, since passing trains produce very strong and gusty air currents at the surface of the ground. On the other hand, if ordinary borax is to be applied to a large area as an aqueous solution, relatively large amounts of water may be required, since the solubility of borax at normal temperatures is only approximately 4%. Whereas that relatively low solubility is inconvenient for that type of application, it offers a distinct advantage over more soluble borate compositions, since the material is less rapidly leached out of the soil by rain.

An important object of the present invention is the economical and effective treatment of vegetation with borate-containing compositions under such special conditions as have been described. The invention provides a remarkably satisfactory procedure by which materials can be prepared in advance, stored for a reasonable period, transported economically to the point of use, and then applied with a minimum of hand labor or other expense.

A further significant advantage of the invention is that vegetation controlling material that has been applied in accordance therewith tends to form a continuous film on the surface of the ground and over the vegetation itself, which film tends to cling to the surface on which it has been deposited and to resist even the strong and gusty type of wind that is created close to passing trains.

In accordance with the invention, materials of the type described are applied with the use of water as a carrying medium, but in the form of a suspension rather than a solution. That procedure offers the great advantage that only a relatively small volume of water has to be handled and transported per pound of chemical agent required, and yet the great economies of hydraulic handling and distribution are fully realized. In a suspension that contains borax, for example, as a primary ingredient, the water phase of the suspension is, of course, substantially saturated with borax. However, the borax that is thus carried in solution is typically only a small fraction of the borax contained in the composition as a whole.

Compositions containing sodium borates are sometimes modified by the addition of a limited amount of some other agent, such as sodium chlorate. The chlorate then tends to give a more rapid action, while the borate prolongs effectiveness of the treatment. However, only a limited proportion of chlorate can be used safely, due to the possibility of fire hazard. The present invention has to do especially with compositions comprising primarily boron-containing compounds, but embraces borate compositions that have been supplemented with other agents, of which chlorate is mentioned as typical. Such other ingredients may conveniently be included in the suspensions of the invention, either in solid phase, as in the case of relatively insoluble materials, or partially or wholly in solution in the liquid phase of the suspension. Sodium chlorate, for example, being considerably more soluble than borax, and being typically used in such compositions in smaller proportions, may, if present, be largely or entirely dissolved.

It has been discovered that application of chemical agents to the soil in the form of a suspension can be very greatly facilitated by including in the composition a stabilizing agent for the suspension that is substantially inert chemically with respect to the agent applied, and that produces a suspension that has a thixotropic nature and remains stable over a relatively long period of time. By a thixotropic suspension is meant one that tends, when held without appreciable stirring, to become relatively thick, so that it is substantially completely stable against segregation of the various solid components or of the liquid and solid phases; and that becomes more fluid upon a moderate amount of agitation. A suspension of that nature is found to have the great advantage that it can be prepared at any convenient time in advance of use and then stored economically, as in liquid storage facilities of standard type, and can be transported without special precautions, for example in ordinary railroad tank cars or in tank trucks, without significant change in the original composition of the suspension; and, at the point of use, the composition can readily be transformed from the original thick and highly stable suspension into a relatively freely flowing composition that can be pumped and delivered by simple hydraulic distribution equipment.

A further aspect of the invention is the discovery that stabilized suspensions of granular sodium borates of the type described can be produced with a variety of stabilizing agents. The preferred process of the invention can be carried out with any stabilizing agent that is substantially inert chemically with respect to the sodium borate and that produces a thixotropic suspension that is stable against segregation of the components substantially indefinitely. The stabilizing agents that have been found most effective for carrying out the invention are substantially insoluble and relatively finely divided materials. Such agents include, for example, fine clays of the type of Wyoming bentonite, granular calcium borates, granular sodium-calcium borates and combinations of those materials.

A full understanding of the invention and of its further objects and advantages may be had from the following description of certain illustrative embodiments, of which description the accompanying drawings form a part. That description is intended only as illustration, and many changes can be made in the particulars of the described procedures and of the drawings without departing from the scope of the invention, which is defined by the appended claims.

In the drawings:

Fig. 1 is a schematic drawing representing an illustrative system for preparing a thixotropic suspension of vegetation-controlling material in accordance with the invention;

Fig. 2 is a side elevation, partly schematic, representing an illustrative system for distributing the suspension; and Fig. 3 is a section on line 3—3 of Fig. 2 with the outer spray nozzles in operating position.

As represented illustratively in Fig. 1, a source of granular borate-containing material for the control of vegetation is indicated schematically at 10. For definiteness and clarity of description that material will be referred to briefly as borax, it being understood as already indicated that other borates than borax may be used, and that the borate composition may include minor proportions of other ingredients. A source of a suitable stabilizing agent, to be described in further detail, is indicated schematically at 14. Borax is supplied from source 10, via a suitable metering device, indicated schematically at 12, to a mixer 20, which may, for example, be a conventional tumbling type of mixer such as is used for mixing concrete. The stabilizing agent is similarly supplied to mixer 20 via a metering device 16. Water is supplied to mixer 20 from a suitable source, indicated as the pipe 17, via a third metering device 18. The three metering means 12, 16 and 18 are operated with suitable coordination, indicated schematically by the broken line 13, in a manner to provide suitably related quantities of the three principal ingredients of the mixture in 20. Those ingredients may be supplied, for example, continuously at suitably related flow rates, or may be supplied in discrete batches of the desired proportions.

The three primary ingredients described are thoroughly mixed in mixer 20 to form a thixotropic suspension or slurry. After mixing, the resulting composition may be applied at once to the area to be treated. However, it is usually more convenient, as indicated in Fig. 1, to move the composition to a storage tank for use at some later time. Such a tank may be stationary, or may be of a type that is itself conveniently transportable. A tank of the latter type is illustratively shown as the railroad tank car 22.

Because of the thixotropic nature of the composition produced in the typical manner described, the solid components of the composition are held in suspension during storage in tank 22 for any reasonable period of time with little or no segregation either from each other or from the liquid phase of the composition. During such storage the suspension rapidly becomes firm, and even quite stiff, and behaves much as if no liquid phase were present at all. In that condition the composition can conveniently be transported to the point of ultimate use.

When it is desired to remove the composition from the tank in which it is stored, either for transportation, for transfer to other storage facilities, or for final application to the area to be treated, the suspension is preferably first transformed from the relatively thick suspension into a more fluid form that is readily handled by ordinary pumping facilities. That may be accomplished, in accordance with the invention, by agitating the composition. Because of its thixotropic nature, the composition typically responds to simple mechanical agitation by becoming relatively fluid and easy to handle.

Fig. 2 represents a simple illustrative system particularly suitable for applying the vegetation-controlling composition to the right of way of a railroad. That system includes means for agitating the stored suspension to render it more fluid. It will be understood that many modifications may be made in that system, and, in particular, that it may readily be adapted for other types of application. A railroad tank car is indicated at 22a, and may, for example, be the same car into which the mixed composition was filled in the system of Fig. 1. Means of any suitable type are provided for agitating the contents of tank 22a preparatory to their removal. Such means are shown illustratively as the air compresser 24, powered by the motor 26 and provided with a compressed air connection 28 to the interior of tank 22a. Compresser 24 and motor 26 are typically shown mounted on a flat car 25, which may be coupled near to tank car 22a in an ordinary work train. Operation of compressor 24 releases air at the lower end of pipe 29 within the relatively stiff suspension in the tank, stirring it in the immediate vicinity of the released air and causing it to become more fluid. The point of release of the air may be shifted about within the interior of the tank, for example, by the use of suitable valve means or by actual physical movement of the inlet pipe 29. In that way it is found possible to agitate the whole of the suspension to render it fluid. That may be done either progressively as the composition is removed, or all at one time in advance of such removal. If the suspension has become unusually thick a limited amount of water may be added. However, such addition of water is not ordinarily necessary and should be made gradually and cautiously to avoid breaking the suspension.

The relatively fluid suspension that results after such agitation may be removed from the tank in any convenient manner, by gravity, by introduction of compressed air to the tank, or otherwise. As shown illustratively, a rotary pump 30 is provided, driven by the motor 29 and provided with a suction connection 32 to the interior of tank 22a, preferably at the bottom of the tank. The delivery side of pump 30 may be connected to a flexible hose with a suitable spray nozzle for distribution of the composition. Alternatively, a plurality of spray nozzles may be rigidly or movably mounted on car 25 in suitable arrangement to give a continuous spray pattern over the area of right of way to be treated. As illustratively shown in Figs. 2 and 3, a set of spray nozzles 35 is rigidly mounted below the car and directed inwardly to cover the ground under the car; and nozzles 38 are mounted in a manner to be extended from the opposite sides of the car or swung inboard for clearance whenever necessary. Piping is indicated at 40, adapted to supply the nozzles 35 and 38 with slurry under suitable spraying pressure from pump, subject to control by valves 42. A water tank 43 is preferably provided to facilitate flushing out the pump and piping after use of the equipment. Such a system provides very convenient and economical distribution of the borate-containing suspension as may be required. The type of pump used at 30 and the design of spray nozzles 35 and 38 must, of course, be suitable for handling a liquid that carries with it solid particles of whatever size distribution is in the slurry composition.

The described process for distributing borate-containing compositions can be successfully carried out with stabilized suspensions of many different types. The process is particularly useful with compositions in which the primary vegetation-controlling component is a type of natural borax from which about two thirds of the initial shale content has been removed. The remaining shale content is typically about 8%. Such relatively crude borax provides $B_2O_3$ in a commonly available and economical form. Although much finer material may be used, it has been found convenient to employ such borax in a relatively coarse size distribution, such, for example, that substantially 90% of the material lies between 10 mesh and 40 mesh. Material of such relatively coarse particle size has the advantage of being less easily displaced after distribution, and is also more stable against leaching by heavy rains. With suitable stabilizing agents, even materials as coarse as 10 mesh can be effectively held in suspension in a thioxotropic slurry. With suitable pumping equipment, and with spray nozzles having openings of a diameter approximately three times that of the largest particles in the composition, such stabilized suspensions can be transported and distributed hydraulically with great convenience and economy.

A satisfactory stabilizing agent for such suspensions must be substantially inert chemically with respect to the sodium borate, since the presence of any appreciable chemical reaction tends to make the stabilization only temporary. For example, aluminum sulfate, which is quite soluble in water, may provide a temporary stability to such suspensions; but after a period of time usually less than a day, probably because of chemical reaction with the sodium borate, the liquid and solid phases of the suspension tend to separate. On the other hand, the present invention provides suspensions of sodium borate that are effectively stable against chemical reaction and against physical segregation of the components for a period of many days, and even months. Such suspensions, which are in full effect permanently stable, and yet can be promptly and readily made fluid, can be produced with a variety of stabilizing agents.

Such stabilizing agents have been found to include calcium and sodium-calcium borates of suitable particle size. Typical of such borates are the minerals colemanite and ulexite. Colemanite is a natural calcium borate of the type $Ca_2B_6O_{11} \cdot 5H_2O$, while ulexite is a natural sodium-calcium borate of the type $NaCaB_5O_9 \cdot 8H_2O$. A satisfactory composition can be prepared in the manner already described, using, for example, about 4 to 8 lbs. of the described type of borax and either about the same weight of colemanite or about two thirds that weight of ulexite per gallon of liquid water.

A particularly effective stabilizing agent has been found to be a type of natural ore that is essentially a mixture of colemanite and ulexite, and contains also an appreciable proportion of insoluble gangue material, largely shale that tends on wetting to break down into a fine clay. Natural ore of that type is mined, for example, at Shoshone in the Death Valley region of the United States, and is known commercially by the trade name Gerstley Borate. That name will be used here for economy of description. The $B_2O_3$ content of Gerstley Borate as typically mined is rather variable, but averages about 34%, and the content of insoluble gangue material averages about 32%.

Gerstley Borate, and also colemanite and ulexite when used separately, are most effective as stabilizing agents when ground to relatively fine mesh size, for example about 150 mesh. Material of less than about 200 mesh is preferred. It has been found that satisfactorily stable suspensions can be prepared, using, for example, the described type of borax with Gerstley Borate as a stabilizing agent, over a range of proportions from about 3 lbs. to about 12 lbs. borax per gallon of liquid water, and from about 0.5 lb. to about 1.5 lbs. Gerstley Borate per pound of borax. A typical preferred composition contains from 7 to 10 lbs. borax and from 5 to 8 lbs. Gerstley Borate per gallon of water.

Satisfactorily stable suspensions of sodium borate compositions can also be produced in which certain types of finely divided clay are employed as stabilizing agents. Wyoming bentonite is a particularly effective type of clay for that purpose. Food suspensions are obtained with the use of 1 part bentonite to from about 3 to about 8 parts sodium borate, the ratio of sodium borate to water being variable between about 6 and about 10 lbs. per gallon. Equally good results have been obtained with a type of clay that is commonly available under the trade name Aquagel. The clay portion of the insoluble gangue found in crude sodium borate ores and also in the described Gerstley Borate may contribute to the stabilization of the suspended borate particles. That is particularly true after prolonged agitation of the suspension, which presumably breaks down the gangue progressively to yield a larger proportion of clay that is fine enough to be effective as a stabilizing agent.

The use of Gerstley Borate as a suspension stabilizing agent has the particular advantage for the purpose described that it has a slippery consistency and tends on drying to form a continuous film of solid material that binds the particles of sodium borate to the surface on which it has been deposited. That cementing action is able to maintain the dried deposit firmly in position against wind or other disturbance through a long period of dry weather. Moreover, the Gerstley Borate, in addition to those valuable physical properties, is itself useful in controlling vegetation. In particular, it tends to prolong the effectiveness of an application, perhaps because it is only slightly soluble in water. In fact, Gerstley Borate is useful by itself and in combination with various water soluble substances for controlling vegetation. For such applications a satisfactorily stable thixotropic suspension of Gerstley Borate may be produced, preferably containing from about 2 lbs. to about 5 lbs. Gerstley Borate per gallon of water or of solution. When used as a stabilizing agent for sodium borate suspensions, as in the preferred compositions of the present invention, Gerstley Borate is doubly useful, improving the overall functioning of the composition after application, as well as greatly facilitating the operation of application.

We claim:

1. A composition of matter for controlling vegetation, comprising an aqueous suspension containing between about 3 and about 12 pounds of sodium borate per gallon of water and containing also a granular natural ore consisting essentially of calcium borate, sodium-calcium borate and insoluble gangue, the said sodium borate and ore being present in a ratio between about 2:3 and about 2:1, and the ore being of a particle size sufficiently fine that it renders the suspension stable and thixotropic.

2. A composition of matter for controlling vegetation, comprising an aqueous suspension containing between about 3 and about 12 pounds of sodium borate per gallon of water and containing also a granular natural ore consisting essentially of calcium borate, sodium-calcium borate and insoluble gangue, the sodium borate being predominantly coarser than about 40 mesh, and the ore being predominantly finer than about 150 mesh and being present in sufficient concentration to render the suspension stable and thixotropic.

3. A composition of matter for controlling vegetation, comprising an aqueous suspension containing between about 4 and about 8 pounds of sodium borate and between about 4 and about 8 pounds of calcium borate per gallon of water, the calcium borate being of a particle size sufficiently fine that it renders the suspension stable and thixotropic.

4. A composition of matter for controlling vegetation, comprising an aqueous suspension containing between about 4 and about 8 pounds of sodium borate and between about 2 and about 6 pounds of sodium-calcium borate per gallon of water, the sodium-calcium borate being of a particle size sufficiently fine that it renders the suspension stable and thixotropic.

5. A composition of matter for hydraulic application to vegetation for controlling the growth thereof, said composition comprising an aqueous suspension containing between about 3 and about 12 pounds of borax per gallon of water, the borax being predominantly coarser than about 40 mesh, the suspension containing also a relatively finely divided granular substantially insoluble substance that is chemically inert with respect to the borax, said substance having thixotropic properties and being present in a concentration that is greater than about ⅛ that of the borax and is sufficient to render the suspension thixotropic and stable during prolonged storage, said suspension being thereafter liquifiable by mild agitation to permit hydraulic application of the suspension, said substance also having the property that, upon evaporation of water from the applied suspension, it binds the borax granules into anchored masses that resist movement by wind.

6. A composition of matter for hydraulic application to vegetation for controlling the growth thereof, said composition comprising an aqueous suspension containing between about 3 and about 12 pounds of borax per gallon of water, the borax being predominantly coarser than about 40 mesh, the suspension containing also a granular substantially insoluble substance that is chemically inert with respect to the borax and is of a particle size predominantly less than 150 mesh, said substance being present in a concentration that is greater than about 1/8 that of the borax and is sufficient to render the suspension stable against segregation of the liquid and solid phases, said substance also having the property that, upon evaporation of water from the applied suspension, it binds the borax granules into anchored masses that resist movement by wind.

7. A composition of matter for hydraulic application to vegetation for controlling the growth thereof, said composition comprising an aqueous suspension containing between about 3 and about 12 pounds of borax per gallon of water, the borax being predominantly coarser than about 40 mesh, the suspension containing also a relatively finely divided granular substantially insoluble substance that is chemically inert with respect to the borax, said substance having thixotropic properties and being present in a concentration that is greater than about 1/8 that of the borax and is sufficient to render the suspension thixotropic and stable during prolonged storage, said suspension being thereafter liquifiable by mild agitation to permit hydraulic application of the suspension.

8. A composition of matter as defined in claim 7, and in which the said substance is selected from the group consisting of bentonite clays, natural ores consisting essentially of calcium borate, sodium-calcium borate and insoluble gangue, calcium borates, sodium-calcium borates, and combinations of the same.

9. A composition of matter as defined in claim 7, and in which the said substance comprises a bentonite clay and is present in the composition in a concentration between about 1/8 and about 1/3 that of the borax.

10. A composition of matter as defined in claim 7, and in which the said substance comprises a natural ore consisting essentially of calcium borate, sodium-calcium borate and insoluble gangue, the said borax and ore being present in a ratio between about 2:3 and about 2:1.

11. In a process for treating vegetation to control its growth, the steps of forming an aqueous suspension containing between about 3 and about 12 pounds of borax granules predominantly coarser than about 40 mesh per gallon of water and containing also a granular substantially insoluble substance that is chemically inert with respect to the borax and that renders the suspension sufficiently thixotropic that it is stable during prolonged storage and thereafter can be rendered fluid by mild agitation, storing and transporting the suspension in its said stable condition, and then agitating the suspension to render it fluid and suitable for hydraulic distribution of the borax granules over the vegetation.

References Cited in the file of this patent

UNITED STATES PATENTS

| | | |
|---|---|---|
| 1,616,904 | Kirschbraun | Feb. 8, 1927 |
| 2,711,367 | Parish | June 11, 1955 |

OTHER REFERENCES

"Hilgardia," December 1936, page 362.

Rogers: "Composition and Properties of Oil Well Drilling Fluids," 1st edition (1948), page 262.